(12) United States Patent
Cronin (10) Patent No.: US 9,509,789 B2
(45) Date of Patent: Nov. 29, 2016

(54) MANAGING MOOD DATA ON A USER DEVICE

(71) Applicant: GrandiOs Technologies, LLC, Wilmington, DE (US)

(72) Inventor: John Cronin, Bonita Springs, FL (US)

(73) Assignee: GRANDIOS TECHNOLOGIES, LLC, Charleston, SC (US)

( * ) Notice: Subject to any disclaimer, the term of this patent is extended or adjusted under 35 U.S.C. 154(b) by 0 days.

(21) Appl. No.: 14/630,151

(22) Filed: Feb. 24, 2015

(65) Prior Publication Data

US 2015/0358415 A1 Dec. 10, 2015

Related U.S. Application Data

(63) Continuation of application No. 62/007,870, filed on Jun. 4, 2014.

(51) Int. Cl.
*H04L 29/08* (2006.01)
*G06Q 50/00* (2012.01)

(52) U.S. Cl.
CPC .............. *H04L 67/22* (2013.01); *G06Q 50/01* (2013.01); *H04L 67/32* (2013.01); *H04L 67/20* (2013.01)

(58) Field of Classification Search
None
See application file for complete search history.

(56) References Cited

U.S. PATENT DOCUMENTS

| | | |
|---|---|---|
| 8,306,977 B1 | 11/2012 | Gildfind |
| 8,589,667 B2 | 11/2013 | Mujtaba et al. |
| 8,611,930 B2 | 12/2013 | Louboutin et al. |
| 8,620,344 B2 | 12/2013 | Huang et al. |
| 8,626,465 B2 | 1/2014 | Moore et al. |
| 8,630,216 B2 | 1/2014 | Deivasigamani et al. |
| 8,660,501 B2 | 2/2014 | Sanguinetti |
| 8,706,044 B2 | 4/2014 | Chang et al. |
| 8,724,723 B2 | 5/2014 | Panicker et al. |
| 8,750,207 B2 | 6/2014 | Jeong et al. |
| 8,793,094 B2 | 7/2014 | Tam et al. |
| 8,816,868 B2 | 8/2014 | Tan et al. |
| 8,831,529 B2 | 9/2014 | Toh et al. |
| 8,831,655 B2 | 9/2014 | Burchill et al. |

(Continued)

FOREIGN PATENT DOCUMENTS

| | | |
|---|---|---|
| WO | US2015/032749 | 5/2015 |
| WO | WO 2015/187429 | 12/2015 |

OTHER PUBLICATIONS

T2 Mood Tracker—Android Apps on Google Play, May 7, 2013 http://play.google.com/store/apps/details?id=com.t2.vas&hl=en.

(Continued)

*Primary Examiner* — Abdullahi E Salad
(74) *Attorney, Agent, or Firm* — Polsinelli LLP (57) ABSTRACT

Methods and systems are presented for managing mood data on a user device. In some embodiments, a user may input mood settings on a user device in order to control mood management. The mood management features may be implemented using a mood management application on the user device. In some embodiments, the mood management system may control the input of mood data from external sources (e.g., haptic feedback from a gaming system) in accordance with the user settings. In some embodiments, the mood management system may control the output of mood data (e.g., a determined mood) to external devices (e.g., immersive environments for affecting a user's mood). In some embodiments, the mood management system may control sharing of and access to mood data stored on a server.

20 Claims, 7 Drawing Sheets

(56) References Cited

U.S. PATENT DOCUMENTS

| | | | |
|---|---|---|---|
| 8,836,851 B2 | 9/2014 | Brunner | |
| 8,843,158 B2 | 9/2014 | Nagaraj | |
| 8,849,308 B2 | 9/2014 | Marti et al. | |
| 8,862,060 B2 | 10/2014 | Mayor | |
| 8,873,418 B2 | 10/2014 | Robinson et al. | |
| 8,874,090 B2 | 10/2014 | Abuan et al. | |
| 8,917,632 B2 | 12/2014 | Zhou et al. | |
| 8,934,921 B2 | 1/2015 | Marti et al. | |
| 2004/0147814 A1 | 7/2004 | Zancho et al. | |
| 2008/0252637 A1* | 10/2008 | Berndt et al. | 345/419 |
| 2008/0294741 A1* | 11/2008 | Dos Santos et al. | 709/206 |
| 2009/0234888 A1 | 9/2009 | Holmes et al. | |
| 2009/0249441 A1* | 10/2009 | Garbow | G06F 3/002 726/1 |
| 2010/0205129 A1* | 8/2010 | Aaron | G06Q 30/02 706/14 |
| 2010/0229105 A1* | 9/2010 | Zaner et al. | 715/753 |
| 2010/0321519 A1* | 12/2010 | Bill | 348/222.1 |
| 2012/0182211 A1 | 7/2012 | Griffin et al. | |
| 2012/0280951 A1* | 11/2012 | Bychkov et al. | 345/184 |
| 2013/0170813 A1* | 7/2013 | Woods et al. | 386/200 |
| 2013/0225261 A1* | 8/2013 | Cruz-Hernandez | 463/23 |
| 2013/0243245 A1 | 9/2013 | Bill | |
| 2013/0254276 A1 | 9/2013 | Ajayi | |
| 2013/0298044 A1* | 11/2013 | Bill | 715/753 |
| 2013/0303192 A1 | 11/2013 | Louboutin | |
| 2013/0311270 A1 | 11/2013 | Daftary et al. | |
| 2013/0317835 A1 | 11/2013 | Mathew | |
| 2013/0328917 A1 | 12/2013 | Zhou | |
| 2013/0331087 A1 | 12/2013 | Shoemaker | |
| 2013/0331118 A1 | 12/2013 | Chhabra | |
| 2013/0331137 A1 | 12/2013 | Burchill | |
| 2013/0332108 A1 | 12/2013 | Patel | |
| 2013/0332156 A1 | 12/2013 | Tackin | |
| 2014/0025620 A1 | 1/2014 | Greenzeiger et al. | |
| 2014/0039916 A1 | 2/2014 | Barden et al. | |
| 2014/0062773 A1 | 3/2014 | MacGougan | |
| 2014/0065962 A1 | 3/2014 | Le | |
| 2014/0071221 A1 | 3/2014 | Dave | |
| 2014/0105084 A1 | 4/2014 | Chhabra | |
| 2014/0107932 A1 | 4/2014 | Luna | |
| 2014/0139380 A1 | 5/2014 | Ouyang | |
| 2014/0141803 A1 | 5/2014 | Marti | |
| 2014/0162628 A1 | 6/2014 | Bevelacqua | |
| 2014/0167794 A1 | 6/2014 | Nath | |
| 2014/0168170 A1 | 6/2014 | Lazarescu | |
| 2014/0171114 A1 | 6/2014 | Marti | |
| 2014/0180820 A1 | 6/2014 | Louboutin | |
| 2014/0191979 A1 | 7/2014 | Tsudik | |
| 2014/0200053 A1 | 7/2014 | Balasubramanian | |
| 2014/0222335 A1 | 8/2014 | Piemonte | |
| 2014/0232633 A1 | 8/2014 | Shultz | |
| 2014/0232634 A1 | 8/2014 | Piemonte | |
| 2014/0247279 A1 | 9/2014 | Nicholas | |
| 2014/0247280 A1 | 9/2014 | Nicholas | |
| 2014/0269562 A1 | 9/2014 | Burchill | |
| 2014/0274150 A1 | 9/2014 | Marti | |
| 2014/0283135 A1 | 9/2014 | Shepherd | |
| 2014/0287833 A1* | 9/2014 | LeBoeuf et al. | 463/31 |
| 2014/0293959 A1 | 10/2014 | Singh | |
| 2014/0364089 A1 | 12/2014 | Lienhart | |
| 2014/0364148 A1 | 12/2014 | Block | |
| 2014/0365120 A1 | 12/2014 | Vulcano | |
| 2015/0011242 A1 | 1/2015 | Nagaraj | |
| 2015/0026623 A1 | 1/2015 | Horne | |
| 2015/0031397 A1 | 1/2015 | Jouaux | |

OTHER PUBLICATIONS

Waterworth et al., Eva L.; "Mood Devices: Interactive Media and Mental Health", Tools for Creativity Studio, Interactive Institute. Date of download: Jan. 29, 2014.

Czyzewicz, Sara; "Mobile Moods: regulating emotions through color theory on mobile devices", Journal of Computing Sciences in Colleges, vol. 20, Iss. 5, May 2005. pp. 114-115.

Matys, Monica; "Using mobile devices to track mood", Sunnybrook, Mental Health, Aug. 12, 2014.

"Mood Apps", Wellcocracy, http://www.wellocracy.com/mobile-mood-apps/, Date of download: Nov. 18, 2015.

Seebode, Julia; "Emotional Feedback for Mobile Devices", T-Labs Series in Telecommunication Services, 2015.

PCT Application No. PCT/US2015/032749 International Search Report and Written Opinion mailed Sep. 3, 2015.

* cited by examiner

MANAGING MOOD DATA ON A USER DEVICE

CROSS-REFERENCE TO RELATED APPLICATION

The present application claims the priority benefit of U.S. provisional application No. 62/007,870 filed Jun. 4, 2014 and entitled "Managing Mood Data on a User Device," the disclosure of which is incorporated herein by reference.

BACKGROUND OF THE INVENTION

1. Field of the Invention

The present invention generally concerns mood data on a user device. More particularly, the present invention concerns managing mood data on a user device.

2. Description of the Related Art

Mood analysis is commonly conducted by having a subject undergo in-person psychological testing. Existing technologies seek to measure a subject's mood using a device or computer. An existing mobile device (e.g., smartphone) application collects data from a user's smartphone activities and estimates a user's mood using the collected data and rule sets. Similarly, existing gaming systems use haptic feedback data to infer a user's state of mind or physical. Other existing devices are designed to impact a user's mood. For example, enhanced reality devices may create a sensory environment that is meant to stimulate an emotional reaction in the user (e.g., to impact the user's mood). In another example, existing relaxation devices use visual cues (e.g., a simulated island environment or LED lights that project a soothing blue wave) and audible cues (e.g., music or simulated rain) to help a user achieve a calm mood. Other existing mood devices still are designed to broadcast a user's mood. As a primitive example, a mood ring changes color with a wearer's body temperature to try to provide a visual mood cue. While an existing application collects smartphone data to estimate a user's mood, there is no functionality for managing mood data across various existing inputs (e.g., haptic feedback data collected at a gaming system) and outputs (e.g., to control LED lights or music).

Existing mood applications do not provide functionality for user control of collecting mood data as inputs or transmitting mood data as outputs. Similarly, existing mood applications do not provide functionality for inputting and outputting mood data in accordance with user settings. Thus, there exists a need for mood data management on a user device in accordance with user settings or preferences.

SUMMARY OF THE CLAIMED INVENTION

Methods and systems are presented for managing mood data on a user device. In some embodiments, a user may input mood settings on a user device in order to control mood management. The mood management features may be implemented using a mood management application on the user device. In some embodiments, the mood management system may control the input of mood data from external sources (e.g., haptic feedback from a gaming system) in accordance with the user settings. In some embodiments, the mood management system may control the output of mood data (e.g., a determined mood) to external devices (e.g., immersive environments for affecting a user's mood). In some embodiments, the mood management system may control sharing of and access to mood data stored on a server.

Various embodiments may include methods for managing mood data on a user device. These methods may include receiving user input via a user interface of the user device, wherein the received user input includes mood management settings. The method may further include activating a mood management feature on the user device based on the user input, and retrieving input mood data from one or more remote input sources over a network based on the mood management settings, wherein the input mood data is used to determine a mood of the user. The method may further include outputting mood data to one or more remote mood devices over the network based on the mood management settings, wherein the one or more remote mood devices perform an action based on the outputted mood data.

Various embodiments may further include systems for transmitting appliance-specific content to a user device associated with an appliance. Such systems may include a user interface that receives user input, wherein the received user input includes mood management settings, and a memory that stores instructions. The systems may further include a processor that executes the instructions stored in the memory to activate a mood management feature on the user device based on the user input. The execution of instructions by the processor may further retrieve input mood data from one or more remote input sources over a network based on the mood management settings, wherein the input mood data is used to determine a mood of the user. The execution of instructions by the processor may further output mood data to one or more remote mood devices over the network based on the mood management settings, wherein the one or more remote mood devices perform an action based on the outputted mood data.

Embodiments of the present invention may further include non-transitory computer-readable storage media, having embodied thereon a program executable by a processor to perform methods for managing mood data on a user device as described herein.

DETAILED DESCRIPTION

Methods and systems are presented for coordinating appliance ownership data from a user device (e.g., mobile phone) with third party appliance service provider data to connect the user and a third party based on the particular appliance (e.g., make and model number). In some embodiments, third party appliance service providers (e.g., manufacturers, distributors, and/or servicers) may connect to an identified appliance and upload appliance data directly into the appliance. User settings, including mood management settings, inputted at the user device may be pushed to the third party platform and stored in the third party platform database. As permitted by the mood management settings, user data, including identification of appliances owned or used by a user of the user device, is sent by the user device to the third party platform, where it is matched to appliance service providers who may have information regarding the model to transmit. The third party platform may transmit the appliance-specific content to the user device in accordance with the user settings. In some embodiments, a user may customize what appliance ownership data is provided to the third party appliance service providers over the third party platform.

Figure 1:
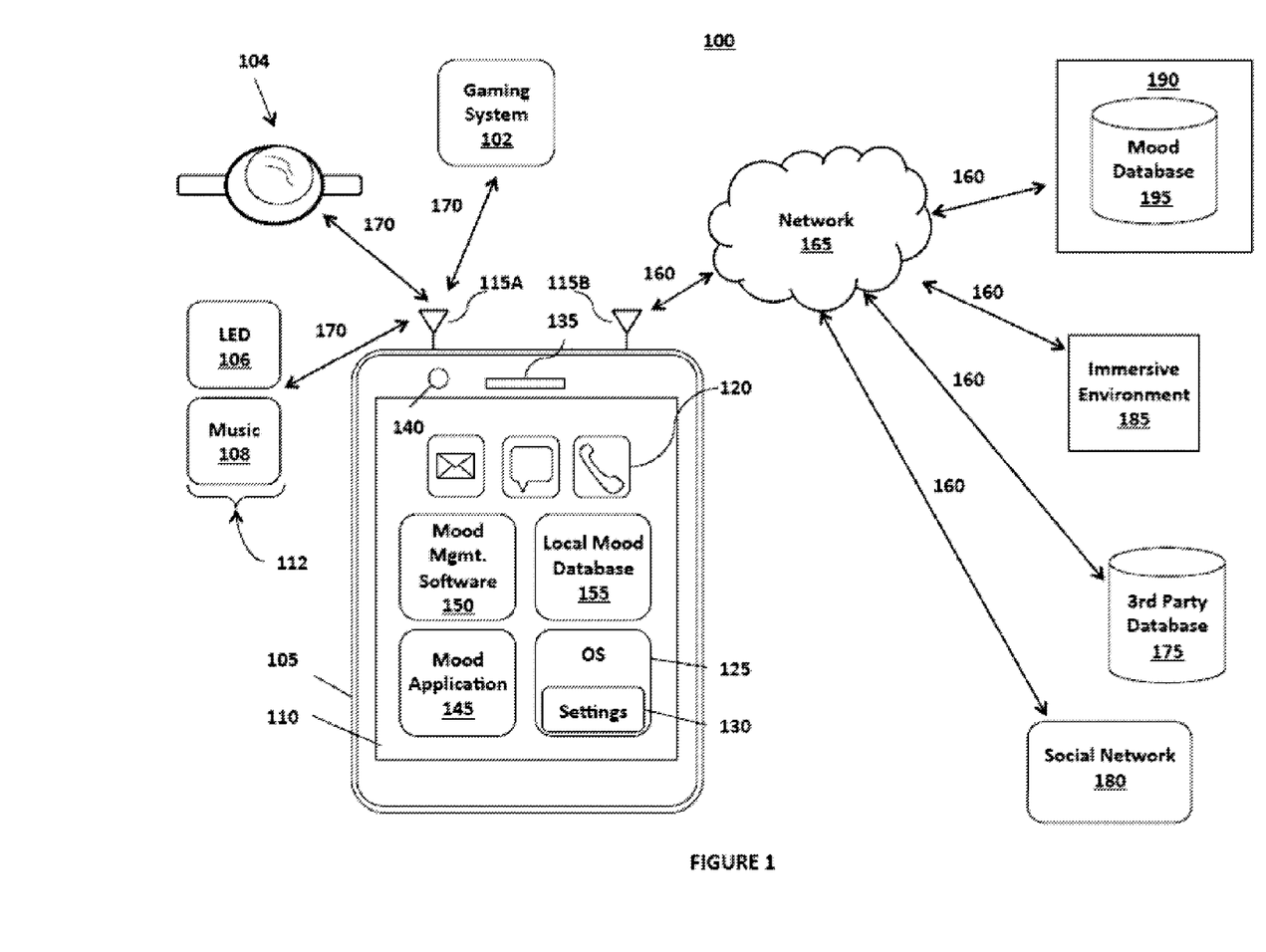
FIG. 1 illustrates an exemplary network environment in which a system for managing mood data on a user device may be implemented.

FIG. 1 illustrates an exemplary network environment 100 in which a system for managing mood data on a user device may be implemented. Network environment 100 may include user device 105, network 165, network connections 150, appliances 155, house 195, appliance servicer 175, advertiser 180, appliance manufacturer 185, and appliance distributor 190. Any combination of the components illustrated in network environment 100, including user device 105, network 165, network connections 150, appliances 155, house 195, appliance servicer 175, advertiser 180, appliance manufacturer 185, and appliance distributor 190, and modules, processes, or subsystems of each, and any other hardware, software, or both, for implementing the features described in the present disclosure may be collectively referred to, herein, as "the system."

User device 105 may be any number of different electronic user devices 105, such as general purpose computers, mobile phones, smartphones, personal digital assistants (PDAs), portable computing devices (e.g., laptop, netbook, tablet), desktop computing devices, handheld computing device, or any other type of computing device capable of communicating over network 165. User devices 105 may also be configured to access data from other storage media, such as memory cards or disk drives as may be appropriate in the case of downloaded services. User device 105 may include standard hardware computing components, including, for example, network and media interfaces, non-transitory computer-readable storage (memory), and processors for executing instructions that may be stored in memory.

In the illustrated embodiment, user device 105 (e.g., mobile phone) includes display 110. In some implementations, display 110 may be a touchscreen display. In some implementations, display 110 is a user interface. As shown in the illustrated embodiment, display 110 may display icons corresponding to applications 120. Display 110 may include any suitable soft keys. User device 105 may also include a speaker 135 and a light 140. It will be understood that user device 105 may include other elements not shown, for example, a microphone, camera, or any other suitable hardware or software elements.

User device 105 may include an operating system 125. Operating system 125 may be software that manages the use of hardware, computer programs, and applications of user device 105. Operating system 125 may be, for example, Windows, iOS, OS X, Android, UNIX, or Linux. User device 105 may additionally include settings 130, which may include configurable components of operating system 125. Settings 130 may be modifiable by a user of the user device to alter the performance of operating system 125 and other software on user device 105. In some embodiments, settings 130 may be an application on the user device 105, by which a user may select options and preferences and configures operating system functions. In an example, operating system 125 of user device 105 (e.g., an Apple device) may be iOS, and the settings 130 of user device 105 may be iOS settings. In another example, operating system 125 may be LINUX, and the settings 130 may be LINUX configuration files. In some embodiments, settings 130 may include mood management settings, which are modifiable by a user to alter the performance of mood management software 150. In some embodiments, settings 130 may be modifiable by a user to configure access to and/or sharing of mood data with third party database 175, social network 180, immersive environment 185, and mood server 190. Settings 130 are described in detail in connection with FIG. 3. In some embodiments, settings 130 may be modifiable by a user to configure sharing of data with external mood impact devices 112, external mood broadcast device 104, and gaming system 102. Settings 130 may also be configurable by the user to determine from which external sources mood data may be inputted to user device 105.

User device 105 may include any suitable software or applications. In some embodiments, personal assistant software (not shown) runs on user device 105. The personal assistant may be software capable of performing tasks for a user based on, for example, user input, location awareness (e.g., using a global positioning system), user settings 130, locally stored information and information accessible over a network (e.g., network 165) from a personal assistant server (not shown), third party database 175, applications 120, social network 180, immersive environment 185, mood server 190, mood database 195, gaming system 102, external mood broadcast device 104, and external mood impact devices 112. Existing, exemplary, personal assistants include, for example, SIRI™ services (for Apple devices), GOOGLE NOW™ services (for Google Android devices), S VOICE™ (for Samsung devices), and VOICE MATE™ services, (for LG Electronics devices). It will be understood that the examples of existing intelligent personal assistants described herein are merely exemplary, and the system of the present disclosure may be implemented using any suitable hardware and/or software.

In some embodiments, personal assistant software (not shown) is a personal assistant application running on user device 105. Personal assistant software may, for example, send messages, make telephone calls, set reminders, make calendar appointments, retrieve data locally or remotely, perform internet searches, generate audio or visual output at a speaker or interface of the user device, or perform any other suitable actions in response to user input. In some embodiments, depressing an electromechanical button (not shown) may activate the personal assistant. In some embodiments, actuating a personal assistant soft key may turn the personal assistant ON or OFF. In some embodiments, a personal assistant on user device 105 may be used to collect mood data, to manage the input and output of mood data, or to provide any other mood data management in accordance with mood management settings.

Applications 120 are software modules on user device 105, which may be downloaded from remote servers. Applications 120 may provide additional functions for user device 105. For example, applications 120 may be any suitable applications downloaded from, for example, Apple Inc.'s APP STORE® (for Apple devices), GOOGLE PLAY® (for Google Android devices), or any other suitable database or server. In some embodiments, applications 140 may be software, firmware, or hardware that is integrated into the user device 105.

Figure 3:
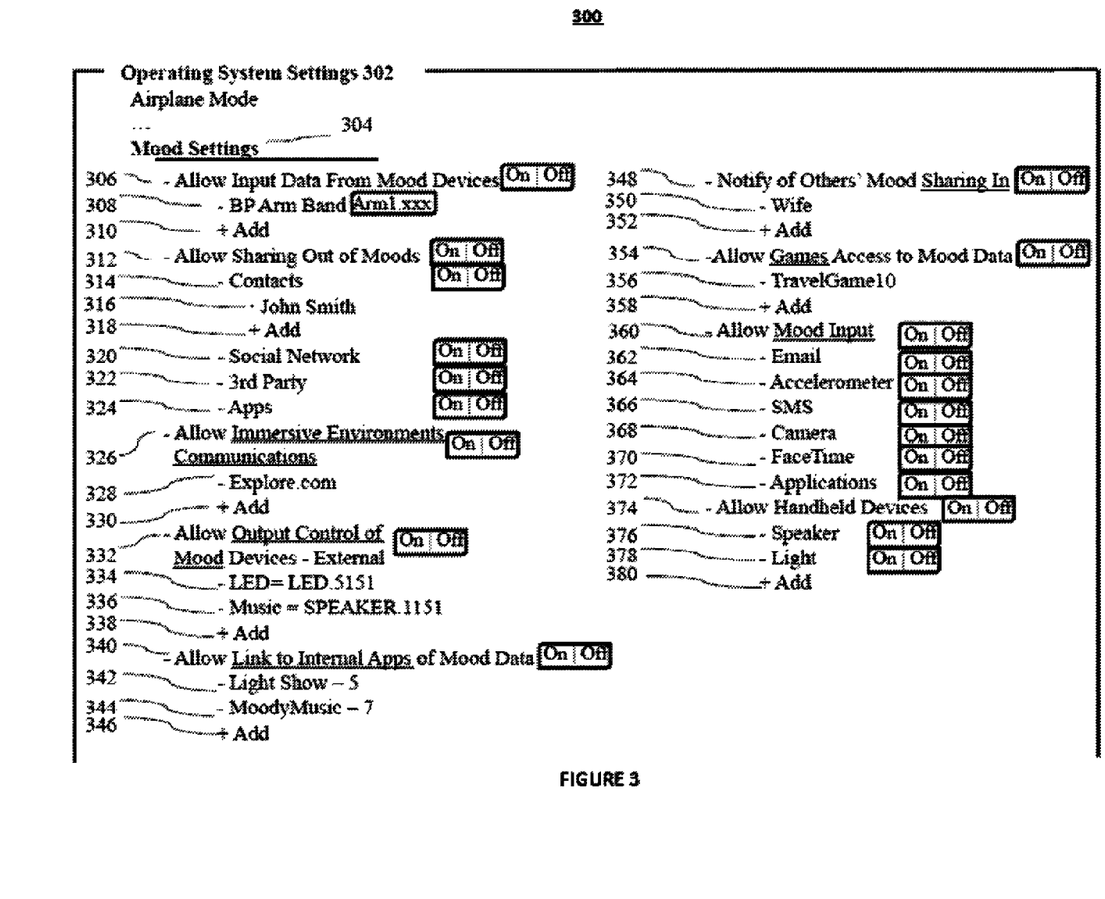
FIG. 3 is a diagram illustrating exemplary settings of an operating system on a user device that may be used with a system for managing mood data on a user device.

Mood management software 150 may be a software module running on user device 105, which may be downloaded from a remote server. Mood management software 150 may provide an interface for display of user settings 130 to a user of user device 105. In particular, a user may use mood management application 145 to set and view mood management settings (described below in connection with 3), which may be used to provide appliance ownership data to third party platform database 170 and various third party appliance service providers 175-190 (e.g., appliance servicer 175, advertiser 180, appliance manufacturer 185, and appliance distributor 190) over third party platform database 170.

User device 105 is also shown as including local mood database 155, which may be used to store mood management settings and mood data input and outputs. Mood application 145 may be any suitable mood application on user device 105, including, for example, a relaxation application or a rain noise generator, or any other suitable application for performing an action in response to mood data, the action designed to or with the result of altering a mood of the user (e.g., playing a rain simulation to calm a user). For example, a mood application may be a puzzle application, and the user may be prompted to play puzzle application when mood data indicates he is in an inquisitive mood.

Antennas 115A and 115B are components of user device 105. In some embodiments, user device 105 may use antennas 115A and 115B to send and receive information wirelessly. For example, antennas 115A and 115B may be cellular data antennas, Wi-Fi antennas, or BLUETOOTH® antennas. In some embodiments, antennas 115A and 115B are implemented as a single antenna. In the illustrated embodiment, antenna 115A is used to establish a BLUETOOTH connection with external mood impact devices 112, external mood broadcast devices 104, and gaming system 102, and antenna 115B is used to establish a network connection with mood server 190, immersive environment 185, third party database 175, and social network 180.

Network connections 160 and 170 may include any suitable wired or wireless transmission mediums or channels through which data may be communicated. In the illustrated embodiment, network connections 170 may communicate data between user device 105, network 165, mood server 190, immersive environment 185, third party database 175, and social network 180. In the illustrated embodiment, network connections 160 may communicate data between user device 105, external mood impact devices 112, external mood broadcast devices 104, and gaming system 102. Network connections 160 and 170 may include, for example, a computer networking cable, an Ethernet cable, a cellular communications network, an Internet data trunk (e.g., single transmission channel), a wireless local area network, a wide area network, or a telecommunications network (e.g., 4G wireless network).

Network 165 may include the Internet, a system of interconnected computer networks that use a standard protocol, a dispersed network of computers and servers, a local network, a public or private intranet, any other coupled computing systems, or any combination thereof. In some embodiments, network 165 may be a cloud, which is a network of remote servers hosted on the Internet and used to store, manage, and process data in place of local servers or personal computers. User device 105 may be coupled to network 165 though any suitable wired or wireless connection. In some embodiments, user device 105 may be coupled to network 165 via network connection 150.

Network 165 may allow for communication between the user device 105, third party platform database 170 and third party appliance service provider 175, and personal assistant server 180 via various communication paths or channels. Such paths or channels may include any type of data communication link known in the art, including TCP/IP connections and Internet connections via Wi-Fi, BLUETOOTH, a Universal Mobile Telecommunications System (UMTS) network, or any other suitable data communication link. In that regard, network 165 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Network 165 allows for communication between any of the various components of network environment 100.

External mood impact devices 112 may be any suitable remote devices for performing an action designed to impact a mood of the user. For example, LED device 106 and music device 108 may generate a soothing light show or play rowdy music depending on mood data of the user. External mood impact devices 112 may receive mood data outputted by user device 105. External mood broadcast device 104 may include any suitable device for generating a representation (e.g., visual or otherwise) of a mood of the user based on the mood data. For example, as shown, a mood ring may enjoy Bluetooth connectivity and may change colors to reflect the mood of the user based on the received mood data from user device 105. Gaming system 102 may include any suitable gaming system (e.g., Xbox 360) that may acquire mood data from a user, using, for example, haptic feedback, biometrics, or any other suitable technique. Gaming system 102 may receive mood data from user device 105 and may alter a game the user is playing based on the mood data. In another example, gaming system 102 may collect mood data, based on the user's interaction with the game and controller, and transmit the mood data to user device 105.

Social network 180 may be any suitable networking platform on which a user may share data or post information. Social network 180 may be coupled to user device 105 and network 165 via network connections 160. In some embodiments, social network 180 may receive user mood data in accordance with settings 130, and if permitted by settings 130, social network 180 may share the user mood data with the user's friends, family, connections, or a group of other users defined by the user at settings 130 of the user device or in social network 180 settings.

Immersive environment 185 may be any suitable virtual reality or artificial environment for altering a mood or affecting an attitude of a user. In some embodiments, immersive environments 185 may be accessible to user device 105 via website links. It will be understood that immersive environment 185 may include any suitable number of immersive environments. Immersive environment 185 may be coupled to user device 105 and network 165 via network connections 160. In an example, immersive environment 185 may receive outputted mood data from user device 105 in accordance with settings 130, and the mood data may indicate that the user of user device 105 needs to be cheered up. Immersive environment 185 may then provide a cheering virtual reality for presentation to the viewer.

Third party database 175 may be any device or server for storage of outputted mood data from user device 105. In the illustrated embodiment, third party database 175 is coupled to network 165 by network connections 160. Third party database 175 may retrieve data over network 165. In an example, an advertiser may user third party database 175 to provide advertisements based on the mood data at user device 105 or an external device operated by the user. In another example, third party database 175 may store mood data outputted by user device 105 in order to provide counseling services for the user.

Mood server 190 may retrieve mood data outputted by user device 105 over network 165. Mood server 190 may be coupled to network 165 and user device 105 by network connections 160. In some embodiments, mood server 190 may include mood database 195 for storing mood data outputted by user device 105. In some embodiments, mood database 195 may also store user settings (e.g., settings 130) received at mood server 190 for sharing the stored mood data in accordance with the user settings. In some embodiments, a plurality of other users may also be connected to mood server 190, which manages sharing of mood data among the plurality of users based on respective user settings, which may be stored in mood database 195. In some embodiments, a user of user device 105 may link to a second user on a separate user device in settings 130, and the user's mood data may be shared with the linked second user via mood server 190 and mood database 195.

Third party database 175, social network 180, immersive environment 185, and mood server 190 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Alternatively, different functionalities may be allocated among multiple servers, which may be located remotely from each other and communicate over the cloud. Any of the aforementioned servers (or an integrated server) may take on certain client-side, cache, or proxy server characteristics. These characteristics may depend on the particular network placement of the server or certain configurations of the server.

Figure 2:
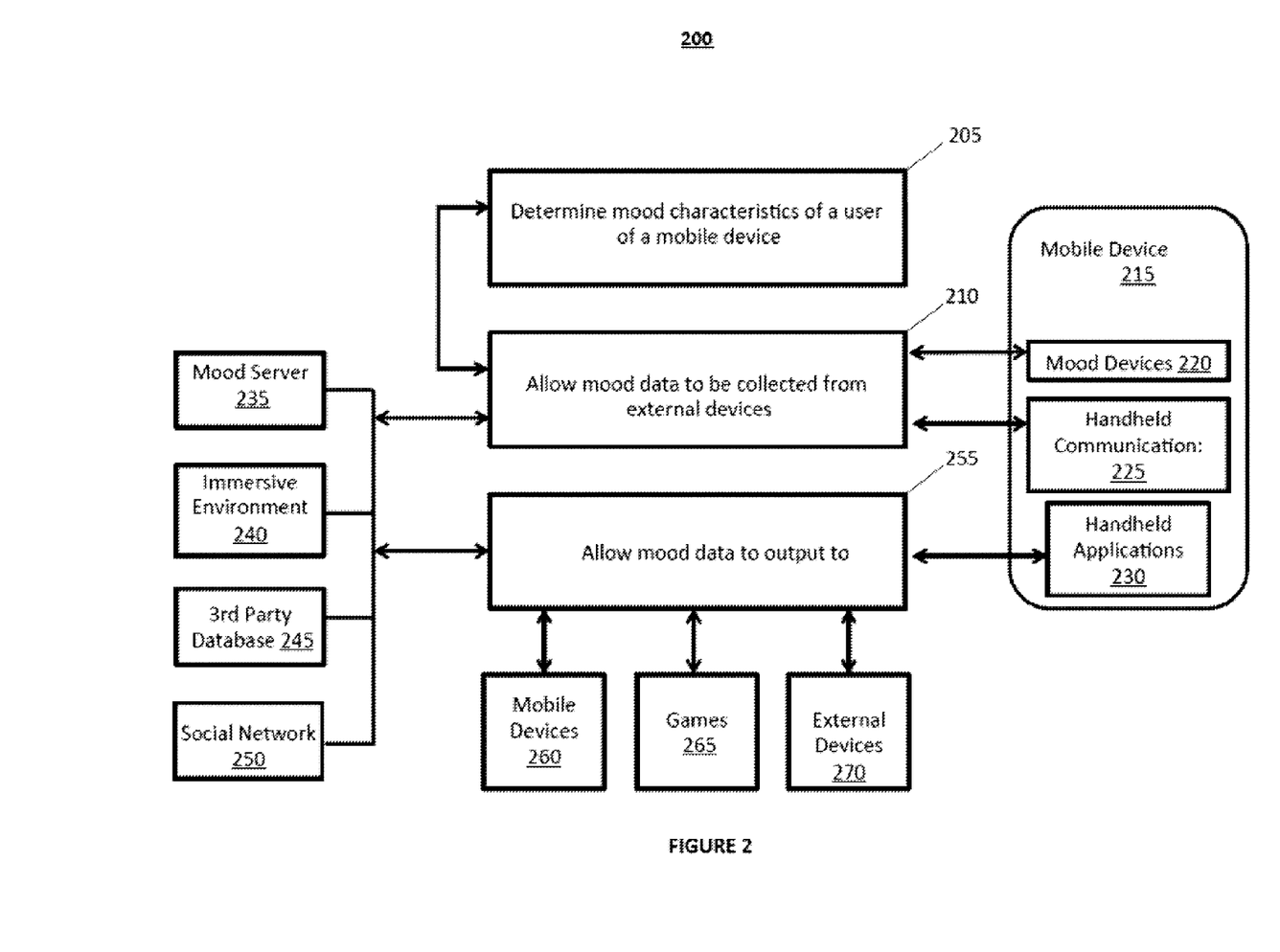
FIG. 2 is a flowchart illustrating an exemplary method for mood management software for managing mood data in association with various devices.

FIG. 2 is a flowchart illustrating an exemplary method 200 for mood management software for managing mood data in association with various devices. In some embodiments, mood management software may correspond to mood management software 150 of FIG. 1.

In step 205, the system may determine mood characteristics of a user of a mobile device. For example, a mood and a mood level (e.g., happy, level 2, or sad, level 5) may be determined based on mood data.

In step 210, the system allows mood data to be collected from (e.g., inputted from) external devices based on mood management settings. In the illustrated embodiment, mood data may be inputted from mood server 235, immersive environment 240, third party database 245, and social network 250. Mood data may also be inputted from local mood devices 220 and handheld communications 225 (e.g., emails, texts, phone calls) on mobile device 215. In some embodiments, local mood devices 220 and handheld communications 225 may be used to retrieve data from external sources. The user may dictate from which of these external devices (and internal sources) the mood management software may input data in mood management settings.

In step 255, the system allows mood data outputted based on mood management settings. In the illustrated embodiment, mood data may be outputted to mood server 235, immersive environment 240, third party database 245, social network 250, mobile devices 260, games 265, external devices 270. The mood data may also be outputted to local handheld applications 230 (e.g., mobile device applications) on mobile device 215, which may, in turn, output the mood data externally based on mood management settings.

FIG. 3 is a diagram illustrating exemplary settings 300 of an operating system on a user device that may be used with a system for managing mood data on a user device. In some embodiments, settings 300 may be displayed on a display screen of user device 105 of FIG. 1. Settings 300 may, for example, provide a mechanism by which a user may alter the functions of an operating system of a user device by implementing changes to settings. User interface 200 may facilitate user interaction with a user device.

User interface 200 may include settings menu 305. Settings menu 305 may include user-editable features for customizing the functionality of an operating system or user device according to user preferences. In some implementations, settings of operating system 125 of user device 105 of FIG. 1 may be modified by the user interacting with options or commands in a respective settings menu 305. Settings menu 305 may include any number of user-selectable options or commands. Settings menu 305 may include any suitable number of standard operating system or user device settings, for example, standard settings, including airplane mode, Wi-Fi, and cellular. Standard settings 210 are exemplary interface elements that, when selected by a user, may, for example, redirect the user to a respective new page, window, or dialogue box.

In some embodiments, settings menu 305 includes a list of user-selectable options or settings presented in a hierarchical order. For example, mood management settings 304 may be sub-settings under standard settings 210. Standard settings 210 may include mood settings 304, which are shown as selected (e.g., underlined) in FIG. 2, and the selection of mood settings 304 may mood management settings 220-295. Mood settings 304 include exemplary settings categories that, when selected by a user, may, for example, redirect the user to a respective new page, window, or dialogue box. In another example, when selected, any of the interface elements may expand to reveal sub-options, sub-commands, or any other suitable settings display elements.

In some embodiments, the mood settings 304 may include user-editable features for customizing the functionality of a mood management application running on a user device. In some embodiments, mood settings 304 may be used to customize the functionality of mood management application 145 of FIG. 1. As illustrated in FIG. 2, mood settings 304 may include a mechanism for selection and de-selection of mood management settings. In the shown embodiment, on/off selection buttons are illustrative examples of mechanisms for selection and de-selection of mood management settings. In some embodiments, selection and de-selection in settings menu 305 are binary selections.

In some embodiments, mood settings 304 includes a sub-menu of mood management settings 220-295, which are user-selectable options or commands for determining the functionality of a mood management applications running on the user device. The mood settings 304 may include any suitable number of selectable mood management settings 220-295, which may correspond to exemplary data and data sources (e.g., third party appliance service providers) to be used in providing mood management features, as shown in FIG. 2. In the some embodiments, mood settings 304 may be selected to be "ON" or "OFF" indicating the feature is activated or deactivated.

In the illustrated embodiment, exemplary mood management settings 306-380 are shown. Using mood management settings, a user may allow or disallow mood data inputs from various internal and external or third party device or sources. For example, allow input data from mood devices 306 dictates whether mood data may be inputted from external mood devices, and allow mood input 360 with sub-options 362-371 dictates whether mood data may be inputted from any of internal mood data sources 362-371. FIG. 1. Various add options may provide functionality for a user to add additional or different sources options than those shown in FIG. 3. For example, add 380 may be used to add additional handheld device features that may be used with mood data (e.g., additional to the exemplary device features 376-378 shown as a speaker and a light of a user device.

The mood management settings may also be used to dictate whether and how mood data is shared at allow sharing out of moods 312, shown with sub-options 314-324, including, for example, sharing with contacts 314, social networks 320, third parties 322, and applications 324 (e.g., a mood music application on the user device). Additionally, notify of others' mood sharing in 348 and sub-settings 350 and 352 may be used to configure notifications of shared mood data from other selected people. Additionally, mood management settings may be used to control the exchange of mood data with an immersive environment using allow immersive environments communications setting 326, shown with sub-settings 328-330.

The mood management settings may also be used to control the output of mood data from the user device to various internal and external recipients. For example, allow output control of mood devices—external 332 may be used to control the output of mood data to external devices, including, for example, LED device 334 and music device 336, which may correspond to LED device 106 and music device 108 of FIG. 1. Allow link to internal applications of mood data 340 may be used to control the use of mood data by applications on the user device (e.g., applications 120 of FIG. 1). Allow games access to mood data 354 may be used to allow or disallow a gaming system access to mood data of user device 105 (e.g., gaming system 102 of FIG. 1).

It will be understood that the mood management settings provided are merely exemplary and not presented by way of limitation. Any other suitable settings for configuring the management of, sharing of, and/or inputting and outputting of mood data may be used by the mood management features described herein.

Figure 4:
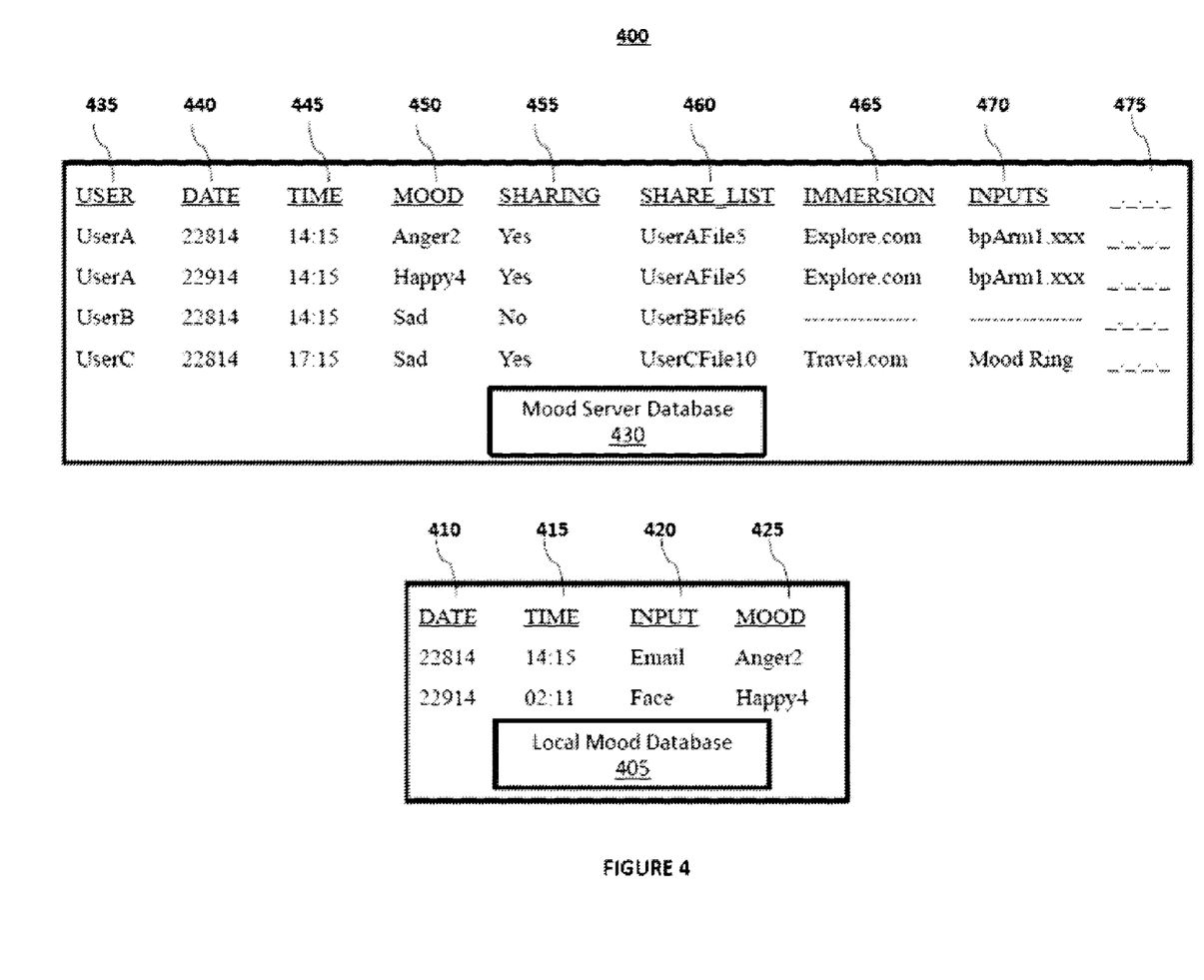
FIG. 4 illustrates an exemplary mood database that may be used with a system for managing mood data on a user device.

FIG. 4 illustrates exemplary mood databases 430 and 405 that may be used with a system for managing mood data on a user device. In some embodiments, mood server database 430 may correspond to mood database 195 of FIG. 1. As described above in connection with FIG. 1, a mood server may be coupled to a user device and a network for receiving outputted mood data from the user device over the network. The mood server (e.g., mood server 190 of FIG. 1) may include mood server database 430 (e.g., mood database 195 of FIG. 1) for storing the mood data. In the illustrated embodiment, mood server database 430 is shown as including mood management settings and mood data retrieved from a user device (e.g., user device 105 of FIG. 1). In some embodiments, the retrieved user settings may correspond to mood settings 304 of settings menu 305 of FIG. 3. In the illustrated embodiment, third party platform database 300 shows user settings as columns of data, including, user 435, date 440, time 445, mood 450, sharing 455, share list 460, immersion 465, and inputs 470. Mood 450 may include a mood and a level (e.g., anger level 2, happy level 4) or just a mood (e.g., sad). Share list 460 includes the files from which the mood data was extracted. For example, mood data may be extracted from a user email, and the email may then be included in share list 460 when sharing 455 is permitted. Immersion 465 includes user settings for allowing immersive environment websites (e.g., Explore.com or travel.com) access to mood data. Inputs 470 identifies a source of the mood data to be shared. Blank column 475 is provided to illustrate that the included user settings are merely exemplary and that any other suitable settings may be included, for example, a setting controlling the output of user mood data. In the illustrated embodiment, mood server database 430 includes rows 1-4, which are illustrative mood management settings retrieved from a user device. It will be understood that the data shown in mood server database 430 is merely exemplary and not presented by way of limitation.

In some embodiments, local mood database 405 may correspond to local mood database 155 of FIG. 1. In some embodiments, local mood database 405 is stored locally on the user device (e.g., user device 105 of FIG. 1). In some embodiments, the retrieved user settings may correspond to mood settings 304 of settings menu 305 of FIG. 3. In the illustrated embodiment, third party platform database 300 shows user settings as columns of data, including, date 410, time 415, input 420 (e.g., where mood data is extracted from), and mood 425 (e.g., mood and level of mood). In the illustrated embodiment, third party database 300 includes rows 1-2, which are illustrative mood management settings retrieved locally on a user device. It will be understood that the data shown in local mood database 405 is merely exemplary and not presented by way of limitation.

Figure 5:
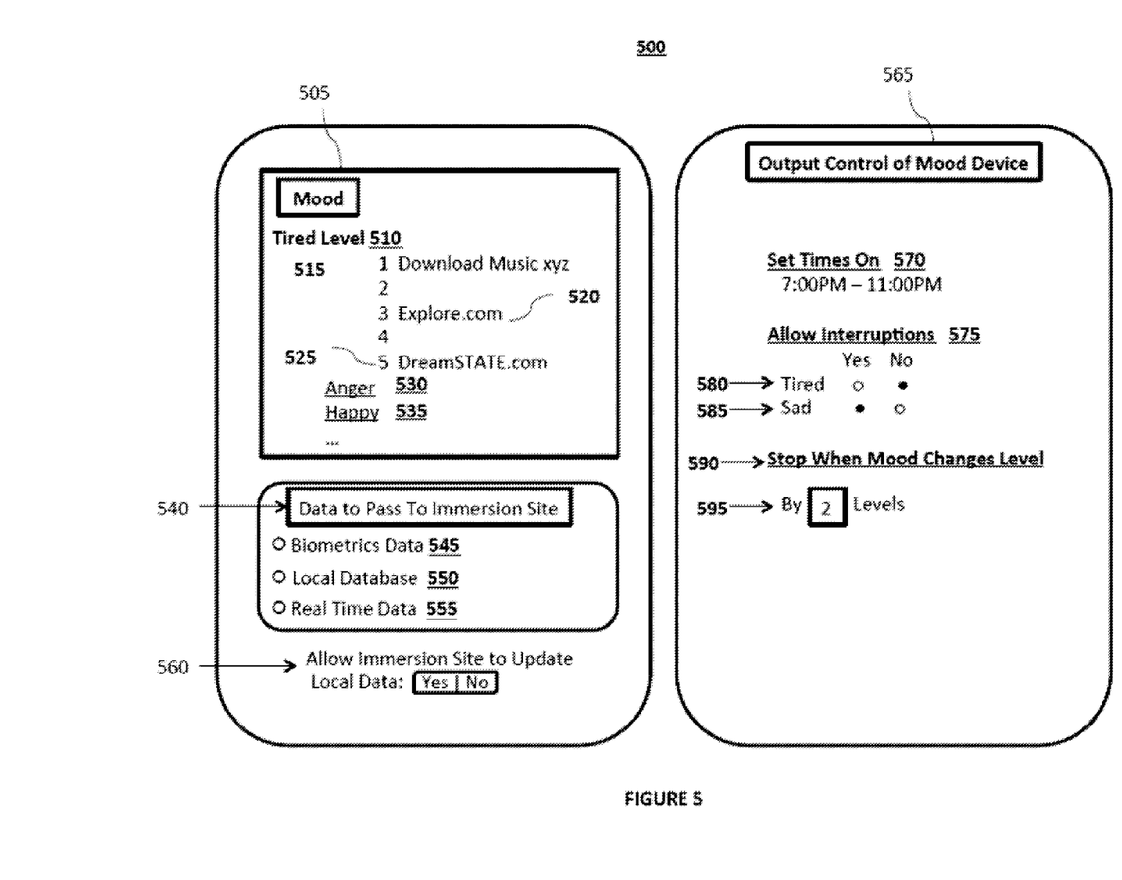
FIG. 5 illustrates exemplary interfaces of a mood management application that may be used with a system for managing mood data on a user device.

FIG. 5 illustrates exemplary interfaces 500A and 500B of a mood management application that may be used with a system for managing mood data on a user device. In some embodiments, mood management features may be implemented on a mood management application (e.g., mood management software 155 of FIG. 1). In FIG. 5, exemplary mood management application settings are shown. In some embodiments, the user inputs at the mood management settings, as described above in connection with FIG. 3, may shape the appearance of interfaces 500 of the mood management application. For example, interface 500A may be presented by the mood management application when allow immersive environments communications 326 of FIG. 3 is activated. Exemplary sub-settings show mood 505 (e.g., tired) and a corresponding list of tired levels 510, which dictate what the mood management application should do at tired levels 515-525, corresponding to levels 1-5, 1 being the least tired, 5 being the most tired. Other emotions may be configured, including, for example, anger 530 and happiness 535. Data to pass to immersion site 540 allows a user to control what data is transmitted to an immersive environment website, including, for example, biometrics data 545, local database data 550, and real time data 555. A user may also allow or disallow updates by an immersive environment at allow immersion site to update local data 560. For example, a user in an immersive environment may interact with the environment in such a way as to provide further mood data that may be fed back to the user device as an update to local data if this is permitted.

Interface 500B may be presented by the mood management application when output control of mood device 565 is activated (e.g., via allow output control of mood 332 of FIG. 3). Interface 500B includes various sub-settings for configuring output of mood data. For example, set times 570 may be used to limit output to a particular time period. Allow interruptions 575 may be used to allow or disallow user interruptions during different moods (e.g., tired 580 and sad 585). A user may also select stop when mood changes level 590 to configure interruptions to stop when a user mood changes by a predetermined amount (e.g., by 2 levels 595).

Figure 6:
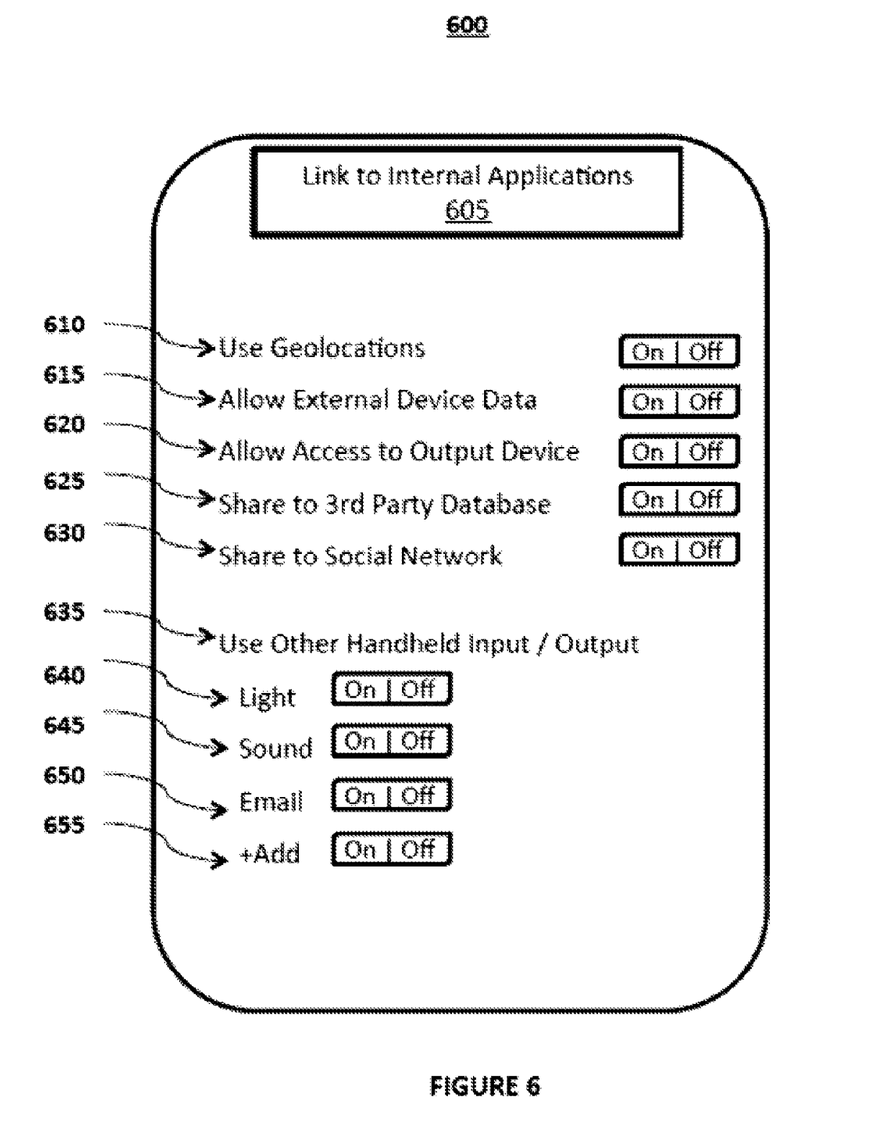
FIG. 6 illustrates an exemplary interface of a mood management application that may be used with a system for managing mood data on a user device.

FIG. 6 illustrates exemplary interface 600 of a mood management application that may be used with a system for managing mood data on a user device. In some embodiments, mood management features may be implemented on a mood management application (e.g., mood management software 155 of FIG. 1). As described above in connection with FIG. 5, the interfaces presented by the mood management application may change depending on user settings described above in connection with FIG. 3. Interface 600 may be presented by the mood management application when link to internal applications 605 is activated (e.g., via allow link to internal apps of mood data 340 of FIG. 3). Interface 600 shows exemplary settings 610-630 for allowing or disallowing local applications (e.g., applications 120 or mood applications 145 of FIG. 1) access to mood data and mood data features. For example, the exemplary internal application settings include use geolocations 610, allow external device data 615, allow access to output device 620, share to third party database 625, and share to social network 630. Additional settings are provided via use other handheld input/output 635, by which a user may allow or disallow internal applications to use local input/output features. For example, input/output sub-settings include light 640, sound 645, and email 650. Add 655 may be used to allow additional or different handheld input/output (e.g., mobile/user device features) to be linked to/used by internal applications in connection with mood management features.

Figure 7:
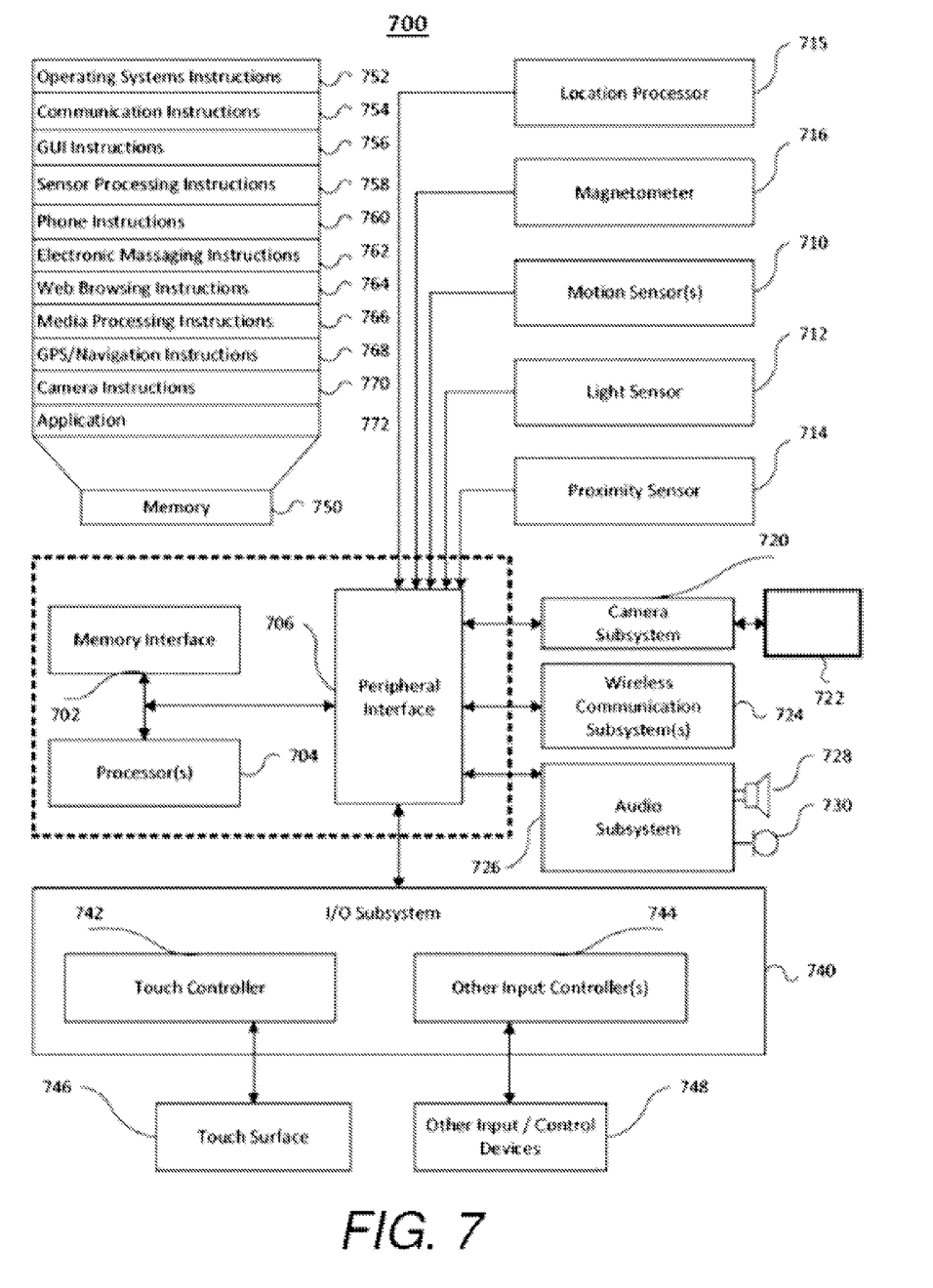
FIG. 7 illustrates a mobile device architecture that may be utilized to implement the various features and processes described herein.

FIG. 7 illustrates a mobile device architecture that may be utilized to implement the various features and processes described herein. Architecture 700 can be implemented in any number of portable devices including but not limited to smart phones, electronic tablets, and gaming devices. Architecture 700 as illustrated in FIG. 7 includes memory interface 702, processors 704, and peripheral interface 706. Memory interface 702, processors 704 and peripherals interface 706 can be separate components or can be integrated as a part of one or more integrated circuits. The various components can be coupled by one or more communication buses or signal lines.

Processors 704 as illustrated in FIG. 7 is meant to be inclusive of data processors, image processors, central processing unit, or any variety of multi-core processing devices. Any variety of sensors, external devices, and external subsystems can be coupled to peripherals interface 706 to facilitate any number of functionalities within the architecture 700 of the exemplar mobile device. For example, motion sensor 710, light sensor 712, and proximity sensor 714 can be coupled to peripherals interface 706 to facilitate orientation, lighting, and proximity functions of the mobile device. For example, light sensor 712 could be utilized to facilitate adjusting the brightness of touch surface 746. Motion sensor 710, which could be exemplified in the context of an accelerometer or gyroscope, could be utilized to detect movement and orientation of the mobile device. Display objects or media could then be presented according to a detected orientation (e.g., portrait or landscape).

Other sensors could be coupled to peripherals interface 706, such as a temperature sensor, a biometric sensor, or other sensing device to facilitate corresponding functionalities. Location processor 715 (e.g., a global positioning transceiver) can be coupled to peripherals interface 706 to allow for generation of geo-location data thereby facilitating geo-positioning. An electronic magnetometer 716 such as an integrated circuit chip could in turn be connected to peripherals interface 706 to provide data related to the direction of true magnetic North whereby the mobile device could enjoy compass or directional functionality. Camera subsystem 720 and an optical sensor 722 such as a charged coupled device (CCD) or a complementary metal-oxide semiconductor (CMOS) optical sensor can facilitate camera functions such as recording photographs and video clips.

Communication functionality can be facilitated through one or more communication subsystems 724, which may include one or more wireless communication subsystems. Wireless communication subsystems 724 can include 802.x or Bluetooth transceivers as well as optical transceivers such as infrared. Wired communication system can include a port device such as a Universal Serial Bus (USB) port or some other wired port connection that can be used to establish a wired coupling to other computing devices such as network access devices, personal computers, printers, displays, or other processing devices capable of receiving or transmitting data. The specific design and implementation of communication subsystem 724 may depend on the communication network or medium over which the device is intended to operate. For example, a device may include wireless communication subsystem designed to operate over a global system for mobile communications (GSM) network, a GPRS network, an enhanced data GSM environment (EDGE) network, 802.x communication networks, code division multiple access (CDMA) networks, or Bluetooth networks. Communication subsystem 724 may include hosting protocols such that the device may be configured as a base station for other wireless devices. Communication subsystems can also allow the device to synchronize with a host device using one or more protocols such as TCP/IP, HTTP, or UDP.

Audio subsystem 726 can be coupled to a speaker 728 and one or more microphones 730 to facilitate voice-enabled functions. These functions might include voice recognition, voice replication, or digital recording. Audio subsystem 726 in conjunction may also encompass traditional telephony functions.

I/O subsystem 740 may include touch controller 742 and/or other input controller(s) 744. Touch controller 742 can be coupled to a touch surface 746. Touch surface 746 and touch controller 742 may detect contact and movement or break thereof using any of a number of touch sensitivity technologies, including but not limited to capacitive, resistive, infrared, or surface acoustic wave technologies. Other proximity sensor arrays or elements for determining one or more points of contact with touch surface 746 may likewise be utilized. In one implementation, touch surface 746 can display virtual or soft buttons and a virtual keyboard, which can be used as an input/output device by the user.

Other input controllers 744 can be coupled to other input/control devices 748 such as one or more buttons, rocker switches, thumb-wheels, infrared ports, USB ports, and/or a pointer device such as a stylus. The one or more buttons (not shown) can include an up/down button for volume control of speaker 728 and/or microphone 730. In some implementations, device 700 can include the functionality of an audio and/or video playback or recording device and may include a pin connector for tethering to other devices.

Memory interface 702 can be coupled to memory 750. Memory 750 can include high-speed random access memory or non-volatile memory such as magnetic disk storage devices, optical storage devices, or flash memory. Memory 750 can store operating system 752, such as Darwin, RTXC, LINUX, UNIX, OS X, ANDROID, WINDOWS, or an embedded operating system such as VxWorks. Operating system 752 may include instructions for handling basic system services and for performing hardware dependent tasks. In some implementations, operating system 752 can include a kernel.

Memory 750 may also store communication instructions 754 to facilitate communicating with other mobile computing devices or servers. Communication instructions 754 can also be used to select an operational mode or communication medium for use by the device based on a geographic location, which could be obtained by the GPS/Navigation instructions 768. Memory 750 may include graphical user interface instructions 756 to facilitate graphic user interface processing such as the generation of an interface; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes, camera instructions 770 to facilitate camera-related processes and functions; and instructions 772 for any other application that may be operating on or in conjunction with the mobile computing device. Memory 750 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 750 can include additional or fewer instructions. Furthermore, various functions of the mobile device may be implemented in hardware and/or in software, including in one or more signal processing and/or application specific integrated circuits.

Certain features may be implemented in a computer system that includes a back-end component, such as a data server, that includes a middleware component, such as an application server or an Internet server, or that includes a front-end component, such as a client computer having a graphical user interface or an Internet browser, or any combination of the foregoing. The components of the system can be connected by any form or medium of digital data communication such as a communication network. Some examples of communication networks include LAN, WAN and the computers and networks forming the Internet. The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an API that can define on or more parameters that are passed between a calling application and other software code such as an operating system, library routine, function that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, and communications capability.

The foregoing detailed description of the technology herein has been presented for purposes of illustration and description. It is not intended to be exhaustive or to limit the technology to the precise form disclosed. Many modifications and variations are possible in light of the above teachings. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for managing mood data on a user device, the method comprising:
receiving mood management settings from a user via a user interface of the user device, wherein the mood management settings facilitates user customization to:
identify one or more user devices and remote mood devices connected to an immersive environment associated with the user from a plurality of user devices and remote mood devices connected to the immersive environment, wherein the identification includes a model type associated with the identified user devices and remote mood devices,
select one or more user devices and remote mood devices, wherein the selected user devices and remote mood devices are allowed to receive user mood data, and
select one or more input sources from a plurality of input sources to obtain user mood data, wherein the selected input sources includes local input sources on the user devices and remote input sources on the remote mood devices;
executing instructions stored in memory, wherein the execution of the instructions by the processor:
activates a mood management feature on the user devices and the remote mood devices based on the mood management settings,
retrieves input mood data from one or more selected input sources, wherein the retrieving input mood data includes retrieving input mood data from the one or more user devices and remote mood devices based on the mood management settings, and outputs a determined mood and mood level of the user based on the retrieved input mood data, wherein the mood level dictates a severity of the user's mood; and sending data regarding the determined mood of the user to the one or more user devices and remote mood devices identified by the mood management settings over the network, wherein the one or more user devices and remote mood devices perform an action based on the outputted mood data.

2. The method of claim 1, wherein the allowed remote input sources include a gaming system.

3. The method of claim 1, wherein the allowed remote mood devices include a mood impact device, wherein the mood impact device uses the mood data to perform an action designed to alter a mood of the user.

4. The method of claim 3, wherein the action performed includes sensory stimulation.

5. The method of claim 1, wherein the allowed remote mood devices include a mood broadcast device, wherein the mood impact device uses the mood data to perform an action designed to provide a visual representation of a mood of the user.

6. The method of claim 1, wherein the execution of instructions by the processor further shares mood data over a mood server based on the mood management settings, and wherein the mood management settings specify a third party with whom the mood data may be shared.

7. The method of claim 6, wherein the third party is a social network.

8. The method of claim 6, wherein the third party includes one or more specified people.

9. The method of claim 1, wherein the execution of instructions by the processor further provides mood data to an immersive environment based on the mood management settings, wherein the immersive environment is generated based on the provided mood data.

10. The method of claim 9, wherein the execution of instructions by the processor further retrieves updated mood data from the immersive environment based on interactions of the user with the immersive environment.

11. The method of claim 1, wherein the execution of instructions by the processor further generates, by an application on the user device, an output based on the mood data, wherein the output includes activating a light of the user device.

12. The method of claim 1, wherein the execution of instructions by the processor further generates, by an application on the user device, an output based on the mood data, wherein the output includes generating an audio output at a speaker of the user device.

13. The method of claim 1, wherein the mood management mode is activated based on the mood management settings.

14. The method of claim 1, wherein activating the mood management feature comprises executing a mood management application on the user device.

15. The method of claim 14, wherein the mood management settings are displayed in an interface of the mood management application.

16. The method of claim 1, wherein the remote input sources include mood servers, immersive environments, third party databases and social networks.

17. The method of claim 1, wherein actions that alter operation of the user devices and remote mood devices based on the outputted mood data are customized by the user.

18. The method of claim 1, wherein sending data to user devices and remote mood devices identified by the mood management settings includes identifying user devices and remote mood devices that the data should not be retrieved from or sent to.

19. An apparatus for managing mood data on a user device, the apparatus comprising:
a user interface that receives user input regarding mood management settings, wherein the mood management settings facilitates user customization for one or more remote mood devices to:
identify one or more user devices and remote mood devices connected to an immersive environment associated with the user from a plurality of user devices and remote mood devices connected to the immersive environment, wherein the identification includes a model type associated with the identified user devices and remote mood devices,
select one or more user devices and remote mood device, wherein the selected user devices and remote mood devices are allowed to receive user mood data, and
select one or more input sources from a plurality of input sources to obtain user mood data, wherein the selected input sources includes local input sources on the user devices and remote input sources on the remote mood devices;
a processor that executes the instructions stored in memory to:
activate a mood management feature on the user devices and the remote mood devices based on the mood management settings;
retrieve input mood data from one or more selected input sources, wherein the retrieving input mood data includes retrieving input mood data from the one or more user devices and remote mood devices based on the mood management settings, and
output a determined mood and mood level of the user based on the retrieved input mood data, wherein the mood level dictates a severity of the user's mood; and
a communication interface that sends data regarding the determined mood of the user to the one or more user devices and remote mood devices identified by the mood management settings over the network, wherein the one or more user devices and remote mood devices perform an action based on the outputted mood data.

20. A non-transitory computer-readable storage medium, having embodied thereon a program executable by a processor for managing mood data on a user device, the method comprising:
receiving mood management settings from a user via a user interface of the user device, wherein the mood management settings facilitates user customization to:
identify one or more user devices and remote mood devices connected to an immersive environment associated with the user from a plurality of user devices and remote mood devices connected to the immersive environment, wherein the identification includes a model type associated with the identified user devices and remote mood devices,
select one or more user devices and remote mood devices, wherein the selected user devices and remote mood devices are allowed to receive user mood data, and
select one or more input sources from a plurality of input sources to obtain user mood data, wherein the selected input sources includes local input sources on the user devices and remote input sources on the remote mood devices;

activating a mood management feature on the user devices and the remote mood devices based on the mood management settings;

retrieving input mood data from one or more selected input sources, wherein the retrieving input mood data includes retrieving input mood data from the one or more user devices and remote mood devices based on the mood management settings;

outputting a determined mood and mood level of the user based on the retrieved input mood data, wherein the mood level dictates a severity of the user's mood; and sending data regarding the determined mood of the user to the one or more user devices and remote mood devices identified by the mood management settings over the network, wherein the one or more user devices and remote mood devices perform an action based on the outputted mood data.

\* \* \* \* \*